(12) United States Patent
Funaoka et al.

(10) Patent No.: US 10,168,901 B2
(45) Date of Patent: Jan. 1, 2019

(54) MEMORY SYSTEM, INFORMATION PROCESSING APPARATUS, CONTROL METHOD, AND INITIALIZATION APPARATUS

(71) Applicant: Toshiba Memory Corporation, Minato-ku (JP)

(72) Inventors: Kenji Funaoka, Kawasaki (JP); Nobuhiro Kondo, Yokohama (JP)

(73) Assignee: TOSHIBA MEMORY CORPORATION, Minato-ku (JP)

( * ) Notice: Subject to any disclaimer, the term of this patent is extended or adjusted under 35 U.S.C. 154(b) by 106 days.

(21) Appl. No.: 14/844,235

(22) Filed: Sep. 3, 2015

(65) Prior Publication Data

US 2016/0266803 A1 Sep. 15, 2016

Related U.S. Application Data

(60) Provisional application No. 62/132,271, filed on Mar. 12, 2015.

(51) Int. Cl.
*G06F 3/06* (2006.01)
*G06F 12/0891* (2016.01)

(52) U.S. Cl.
CPC .......... *G06F 3/0604* (2013.01); *G06F 3/0632* (2013.01); *G06F 3/0673* (2013.01); *G06F 12/0891* (2013.01)

(58) Field of Classification Search
CPC ................................ G06F 3/06; G06F 12/0891
See application file for complete search history.

(56) References Cited

U.S. PATENT DOCUMENTS

| 6,298,425 B1 * | 10/2001 | Whitaker | G06F 11/1435 |
| | | | 707/999.202 |
| 6,973,541 B1 * | 12/2005 | Williams | G06F 9/30047 |
| | | | 711/118 |
| 8,499,098 B2 * | 7/2013 | Nakagawa | G06F 3/0613 |
| | | | 709/211 |
| 8,725,975 B2 * | 5/2014 | Moyer | G06F 11/1008 |
| | | | 711/166 |
| 2006/0031646 A1 * | 2/2006 | Maruyama | G06F 11/2058 |
| | | | 711/162 |

(Continued)

FOREIGN PATENT DOCUMENTS

| JP | 2000-259491 | 9/2000 |
| JP | 2010-541103 | 12/2010 |

*Primary Examiner* — Charles Rones
*Assistant Examiner* — Tian-Pong Chang
(74) *Attorney, Agent, or Firm* — Oblon, McClelland, Maier & Neustadt, L.L.P.

(57) ABSTRACT

According to one embodiment, there is provided an initialization apparatus connectable to a storage apparatus. The initialization apparatus including a controller configured to transmit a first command to the storage apparatus, to transmit a second command to the storage apparatus, and to transmit a third command to the storage apparatus. The first command is a command to write a first value into a first storage area in the storage apparatus. The second command is a command to copy the first value stored in the first storage area to a second storage area in the storage apparatus. The third command is a command to copy the first values stored in the first storage area and the second storage area to a third storage area in the storage apparatus.

20 Claims, 11 Drawing Sheets

(56) References Cited

U.S. PATENT DOCUMENTS

| | | | |
|---|---|---|---|
| 2008/0059703 A1* | 3/2008 | Yoshioka | G11C 7/20 |
| | | | 711/115 |
| 2009/0089515 A1 | 4/2009 | Michalak et al. | |
| 2011/0110214 A1* | 5/2011 | Takahashi | G11B 20/1883 |
| | | | 369/100 |
| 2013/0055013 A1* | 2/2013 | Seki | G06F 11/1092 |
| | | | 714/6.24 |
| 2013/0275650 A1* | 10/2013 | Hida | G06F 12/0246 |
| | | | 711/102 |
| 2014/0032828 A1* | 1/2014 | Khailany | G06F 3/065 |
| | | | 711/105 |
| 2014/0032855 A1* | 1/2014 | Shinozaki | G06F 12/0804 |
| | | | 711/142 |
| 2016/0011964 A1* | 1/2016 | Rostoker | G06F 3/06 |
| | | | 711/103 |
| 2016/0210237 A1* | 7/2016 | Kobayashi | G06F 17/3048 |

* cited by examiner

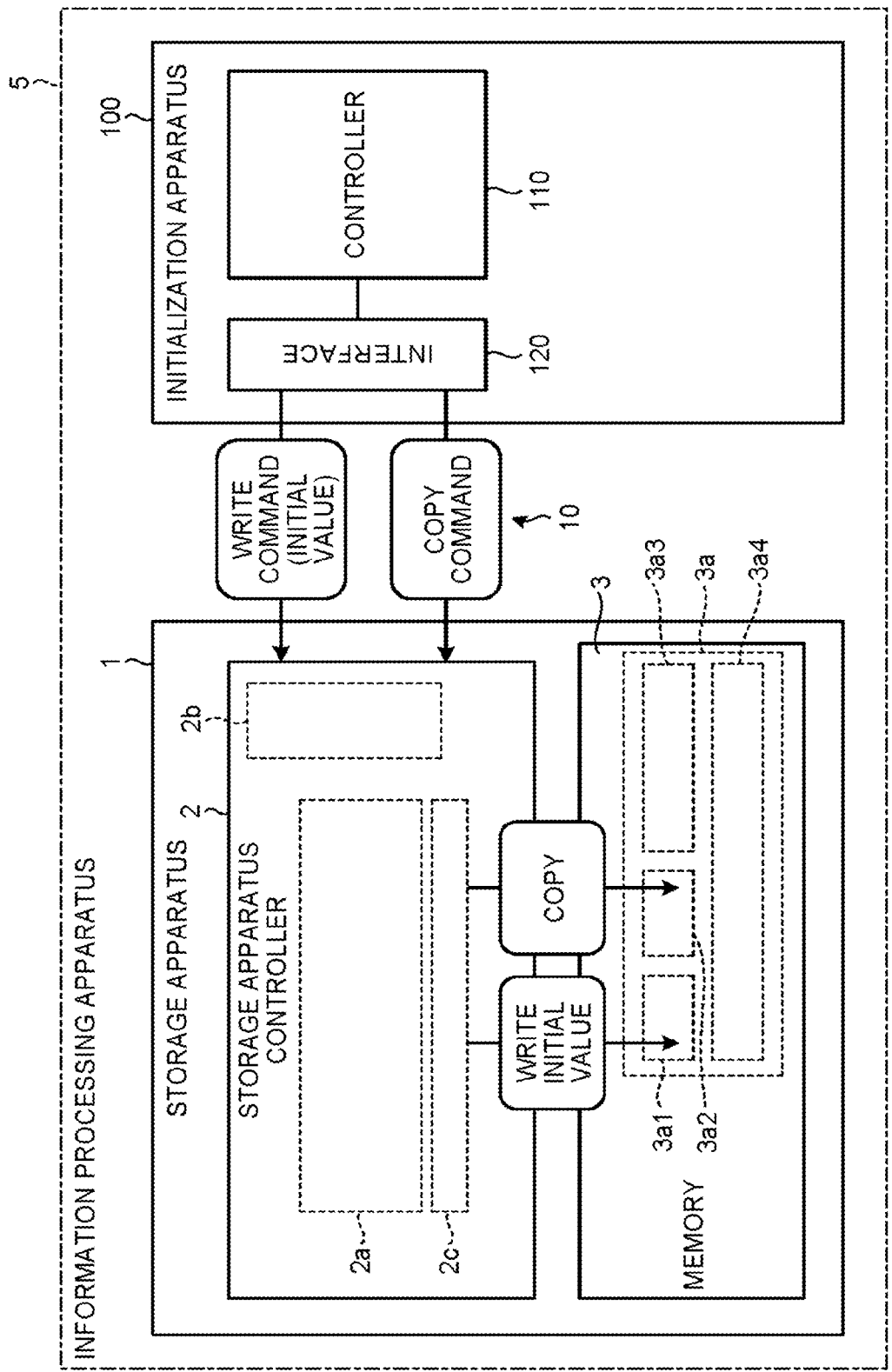

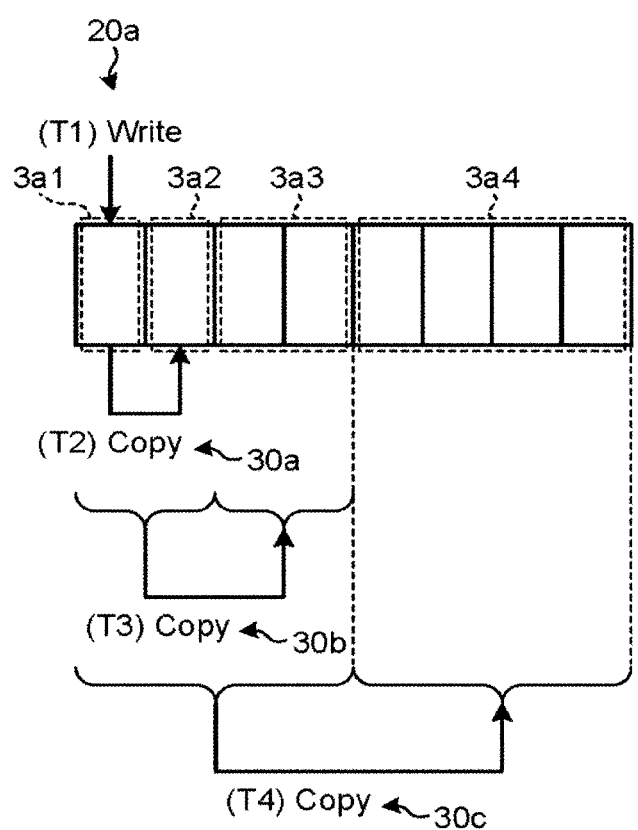

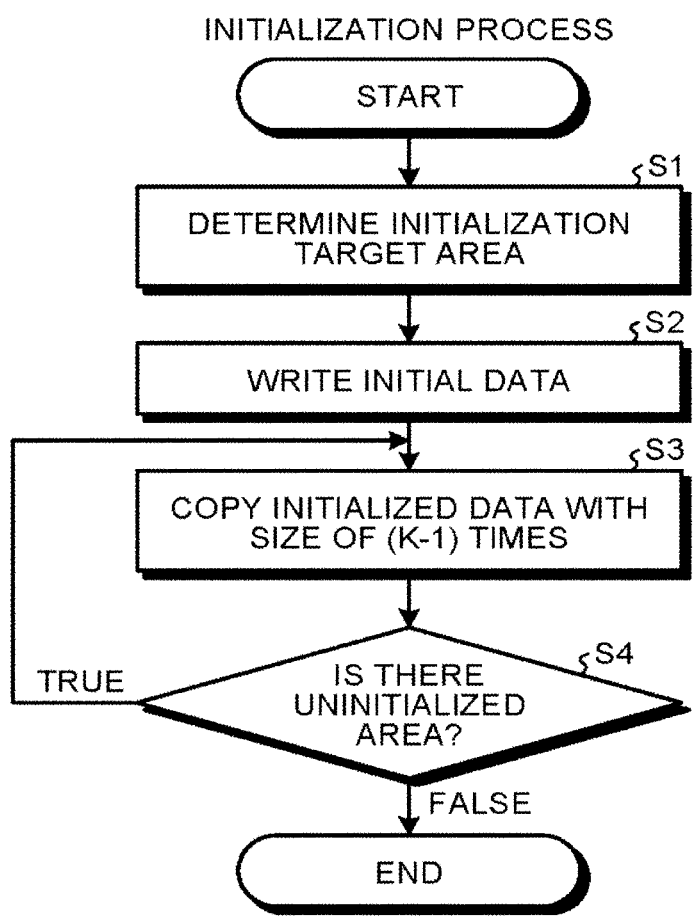

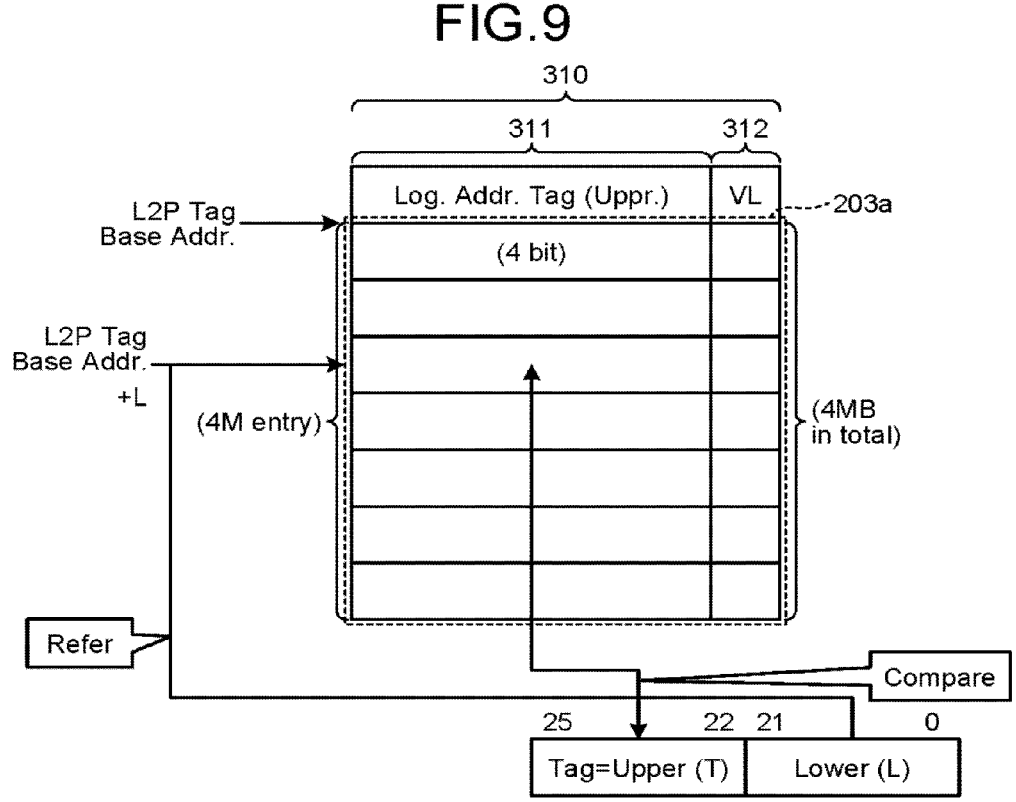
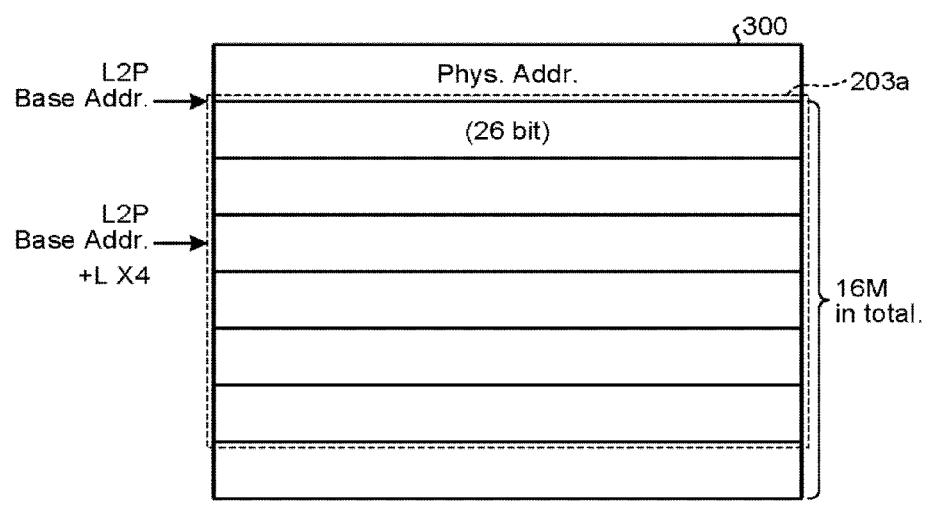

MEMORY SYSTEM, INFORMATION PROCESSING APPARATUS, CONTROL METHOD, AND INITIALIZATION APPARATUS

CROSS-REFERENCE TO RELATED APPLICATIONS

This application is based upon and claims the benefit of priority from U.S. Provisional Application No. 62/132,271, filed on Mar. 12, 2015 the entire contents of which are incorporated herein by reference.

FIELD

Embodiments described herein relate generally to a memory system, an information processing apparatus, a control method, and an initialization apparatus.

BACKGROUND

An initialization apparatus may request a storage apparatus to initialize a predetermined storage area of the storage apparatus. At this time, it is preferable to efficiently perform initialization.

BRIEF DESCRIPTION OF THE DRAWINGS

FIG. 1 is a diagram that illustrates the configuration of an initialization apparatus according to a first embodiment;

FIG. 3 is a diagram that illustrates an initialization process according to the first embodiment;

FIG. 4 is a flowchart that illustrates the initialization process according to the first embodiment;

FIG. 9 is a diagram that illustrates the configuration of an L2P cache tag area according to the second embodiment;

FIG. 10 is a diagram that illustrates the configuration of the L2P cache area according to the second embodiment;

DETAILED DESCRIPTION

Figure 2A:
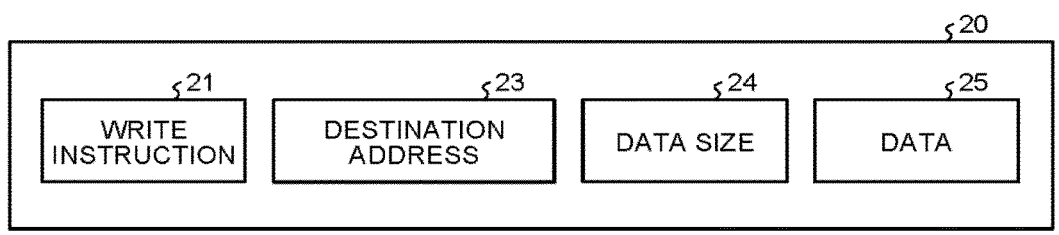
FIG. 2A is a diagram that illustrates the data structure of a write command according to the first embodiment.

In general, according to one embodiment, there is provided an initialization apparatus connectable to a storage apparatus. The initialization apparatus including a controller configured to transmit a first command to the storage apparatus, to transmit a second command to the storage apparatus, and to transmit a third command to the storage apparatus. The first command is a command to write a first value into a first storage area in the storage apparatus. The second command is a command to copy the first value stored in the first storage area to a second storage area in the storage apparatus. The third command is a command to copy the first values stored in the first storage area and the second storage area to a third storage area in the storage apparatus.

Exemplary embodiments of an initialization apparatus will be explained below in detail with reference to the accompanying drawings. The present invention is not limited to the following embodiments.

First Embodiment

An initialization apparatus 100 according to a first embodiment will be described with reference to FIG. 1. FIG. 1 is a diagram that illustrates the configuration of the initialization apparatus 100.

The initialization apparatus 100 is included in an information processing apparatus 5. The information processing apparatus 5 includes: the initialization apparatus 100; a communication line 10; and a storage apparatus 1. In the information processing apparatus 5, the initialization apparatus 100 is connected to the storage apparatus 1 through the communication line 10.

There are cases where the initialization apparatus 100 requests the storage apparatus 1 to initialize a predetermined storage area of the storage apparatus 1. For example, in a case where the initialization apparatus 100 is instructed to initialize a predetermined storage area from the outside (for example, an upper-level controller not illustrated in the figure), the initialization apparatus 100 determines that the predetermined storage area needs to be initialized in response to the received instruction. In addition, in a case where a predetermined operation condition is satisfied (for example, the use of a predetermined storage area arranged inside the operated storage apparatus 1 is permitted to the initialization apparatus 100), the initialization apparatus 100 determines that the predetermined storage area needs to be initialized. When the predetermined storage area is determined to be initialized, the initialization apparatus 100 accesses the storage apparatus 1 through the communication line 10 and performs control of the storage apparatus 1 to initialize the predetermined storage area.

More specifically, the initialization apparatus 100 includes a controller 110 and an interface 120. The storage apparatus 1 includes a storage apparatus controller 2 and a memory 3. The memory 3, for example, may be a volatile memory such as a DRAM or an SRAM or may be a nonvolatile memory such as a flash memory, a FeRAM, a ReRAM, an MRAM, or a PRAM. The controller 110 specifies at least a part of the storage area of the memory 3 as an initialization target area 3a.

At this time, for example, a sequence will be considered in which the controller 110 divides a specified initialization target area 3a into a plurality of areas and request to write an initial value into each area. The controller 110 sequentially generates a write command for selecting one area from among a plurality of areas and writing an initial value into the selected area for each of the plurality of areas and transmits the write commands to the interface 120. The initial value is a bit pattern defined as an initial value in the information processing apparatus 5. The initial value, for example, may be a bit pattern of all "0"s, a bit pattern of all "1"s, or a bit pattern in which "0"s and "1"s are mixed such as "01011010". When a write command is received from the controller 110, the interface 120 transmits the write command to the storage apparatus 1 through the communication line 10.

In this sequence, in a case where an initialization target area 3a is divided into N (here, N is an integer of two or more) areas, the interface 120 of the initialization apparatus 100 transmits a write command to the storage apparatus 1 N times.

Here, FIG. 2A is a diagram that illustrates the data structure of the write command. The write command, as illustrated in FIG. 2A, includes data 25 that is data to be written. For example, the write command 20 includes: a write instruction 21; a destination address 23; a data size 24; and data 25. The write instruction 21 represents that the write command 20 is a command for an instruction for writing data. The destination address 23 is an address (in the example described above, an address of an area of the memory 3) of an area in which data is to be written and, for example, is a start address. The data size 24 represents the size of data to be written. In addition, the data 25 is data to be written and has a data size corresponding to an area to be written. In the write command 20, the data size of the data 25 is remarkably larger than that of the write instruction 21, the destination address 23, and the data size 24.

As above, in the sequence in which the initialization target area 3a is divided into a plurality of areas, and the initial value is requested to be sequentially written, the transmission of a write command from the initialization apparatus 100 to the storage apparatus 1 N times. At this time, since the data size of the data 25 included in the write command is large, there is a possibility that it takes a long time until the reception of the write command in the interface 2b is completed after start of the transmission of the write command from the interface 120. In addition, there is a possibility that it takes a long time for data transmission from the interface 2b to a controller main unit 2a inside the storage apparatus 1 and data transmission from the controller main unit 2a to the interface 2c. Accordingly, there is a possibility that a long time is required for the initialization process performed by the initialization apparatus 100.

Thus, in this embodiment, a high-speed initialization process is achieved by performing control of the storage apparatus 1 to write an initial value into an area 3a1 of the initialization target area 3a and copy the initial value, which has already been stored in the area, to the other areas 3a2 to 3a4.

More specifically, in the initialization apparatus 100, in a case where a first area 3a1 is selected from among a plurality of areas 3a1 to 3a4, the controller 110 requests the storage apparatus 1 to write an initial value into the storage area 3a1. In a case where a second area 3a2 is selected from among the plurality of areas 3a1 to 3a4, the controller 110 requests to copy at least a part of the initial value stored in the storage area 3a1 into the storage area 3a2. In addition, in a case where a third area 3a3 is selected from among the plurality of areas 3a1 to 3a4, the controller 110 requests to copy at least a part of the initial values stored in the area 3a1 and the storage area 3a2 into the area 3a3. In a case where a fourth area 3a4 is selected from among the plurality of areas 3a1 to 3a4, the controller 110 requests to copy at least a part of the initial values stored in the area 3a1, the storage area 3a2, and the storage area 3a3 into the area 3a4.

For example, as illustrated in FIG. 3, in a period T1, the controller 110 generates a write command 20a and transmits the generated write command 20a to the interface 120. FIG. 3 is a diagram that illustrates an initialization process. The write command 20a is a command for writing an initial value into the storage area 3a1. The initial value is a bit pattern defined as an initial value in the information processing apparatus 5. The initial value, for example, may be a bit pattern of all "0"s, a bit pattern of all "1"s, or a bit pattern in which "0"s and "1"s are mixed such as "01011010". The interface 120 transmits the write command 20a to the storage apparatus 1 through the communication line 10.

The interface 2b of the storage apparatus 1 receives the write command 20a from the initialization apparatus 100 through the communication line 10. The interface 2b transmits the write command 20a to the controller main unit 2a. The controller main unit 2a generates a write instruction WI1 for writing an initial value into the area 3a1 according to the write command 20a and transmits the generated write instruction WI1 to the interface 2c. The interface 2c writes the initial value into the area 3a1 according to the write instruction WI1. When the completion of the writing of the initial value into the area 3a1 using the interface 2c is recognized, the controller main unit 2a transmits a completion notification CN1 thereof to the interface 2b. The interface 2b transmits the completion notification CN1 to the initialization apparatus 100 through the communication line 10.

The interface 120 of the initialization apparatus 100 receives the completion notification CN1 from the storage apparatus 1 through the communication line 10. The interface 120 transmits the completion notification CN1 to the controller 110.

In a period T2, the controller 110 generates a copy command 30a in response to the completion notification CN1. The copy command 30a is a command for copying the initial value stored in the area 3a1 to the area 3a2.

Figure 2B:
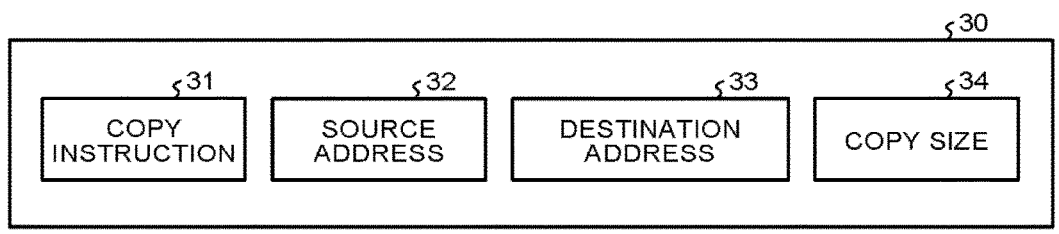
FIG. 2B is a diagram that illustrates the data structure of a copy command according to the first embodiment.

Here, FIG. 2B is a diagram that illustrates the data structure of the copy command. The copy command, as illustrated in FIG. 2B, does not include data to be written. For example, the copy command 30 includes: a copy instruction 31; a source address 32; a destination address 33; and a copy size 34. The copy instruction 31 represents that the copy command 30 is a command for an instruction for copying data. The source address 32 is an address (in the example described above, an address of a copy source area of the memory 3) of a copy source area. The destination address 33 is an address (in the example described above, an address of a copy destination area of the memory 3) of a copy destination area. The copy size 34 represents the size of data to be copied. For example, the copy size 34 may be determined such that a total size of the size of the area in which the initial value has already been stored and the size of data to be copied is K times (here, K is a number that is more than one and two or less) of the size of the area in which the initial value has already been stored. In other words, the following Equation 1 is formed.

(size of data to be copied)=(K−1)×(size of area in which initial value has already been stored)    Equation 1

In FIG. 3, a case of K=2 (times) is illustrated, and the following Equation 2 is formed for the copy command 30a.

(size of data to be copied)=(size of area 3a2)=1× (size of area 3a1 in which initial values have already been stored)    Equation 2

For example, the controller 110 transmits the generated copy command 30a to the interface 120. The interface 120 transmits the copy command 30a to the storage apparatus 1 through the communication line 10.

The interface 2b of the storage apparatus 1 receives the copy command 30a from the initialization apparatus 100 through the communication line 10. The interface 2b transmits the copy command 30a to the controller main unit 2a. The controller main unit 2a generates a copy instruction CI1 for copying the initial value stored in the area 3a1 to the area 3a2 according to the copy command 30a and transmits the generated copy instruction CI1 to the interface 2c. The interface 2c copies the initial value stored in the area 3a1 to the area 3a2 according to the copy instruction CI1. When the completion of the copying of the initial value from the area 3a1 to the area 3a2 using the interface 2c is recognized, the controller main unit 2a transmits a completion notification CN2 thereof to the interface 2b. The interface 2b transmits the completion notification CN2 to the initialization apparatus 100 through the communication line 10.

The interface 120 of the initialization apparatus 100 receives the completion notification CN2 from the storage apparatus 1 through the communication line 10. The interface 120 transmits the completion notification CN2 to the controller 110.

In a period T3, the controller 110 generates a copy command 30b in response to the completion notification CN2. The copy command 30b is a command for copying the initial values stored in the areas 3a1 and 3a2 to the area 3a3.

In FIG. 3, a case of K=2 (times) is illustrated, and the following Equation 3 is formed for the copy command 30b.

(size of data to be copied)=(size of area 3a3)=1×
(size of areas 3a1 and 3a2 in which initial values have already been stored)   Equation 3

For example, the controller 110 transmits the generated copy command 30b to the interface 120. The interface 120 transmits the copy command 30b to the storage apparatus 1 through the communication line 10.

The interface 2b of the storage apparatus 1 receives the copy command 30b from the initialization apparatus 100 through the communication line 10. The interface 2b transmits the copy command 30b to the controller main unit 2a. The controller main unit 2a generates a copy instruction CI2 for copying the initial values stored in the areas 3a1 and 3a2 to the area 3a3 according to the copy command 30b and transmits the generated copy instruction CI2 to the interface 2c. The interface 2c copies the initial values stored in the areas 3a1 and 3a2 to the area 3a3 according to the copy instruction CI2. When the completion of the copying of the initial values from the areas 3a1 and 3a2 to the area 3a3 using the interface 2c is recognized, the controller main unit 2a transmits a completion notification CN3 thereof to the interface 2b. The interface 2b transmits the completion notification CN3 to the initialization apparatus 100 through the communication line 10.

The interface 120 of the initialization apparatus 100 receives the completion notification CN3 from the storage apparatus 1 through the communication line 10. The interface 120 transmits the completion notification CN3 to the controller 110.

In a period T4, the controller 110 generates a copy command 30c in response to the completion notification CN3. The copy command 30c is a command for copying the initial values stored in the areas 3a1 to 3a3 to the area 3a4.

In FIG. 3, a case of K=2 (times) is illustrated, and the following Equation 4 is formed for the copy command 30c.

(size of data to be copied)=(size of area 3a4)=1×
(size of areas 3a1 to 3a3 in which initial values have already been stored)   Equation 4

For example, the controller 110 transmits the generated copy command 30c to the interface 120. The interface 120 transmits the copy command 30c to the storage apparatus 1 through the communication line 10.

The interface 2b of the storage apparatus 1 receives the copy command 30c from the initialization apparatus 100 through the communication line 10. The interface 2b transmits the copy command 30c to the controller main unit 2a. The controller main unit 2a generates a copy instruction CI3 for copying the initial values stored in the areas 3a1 to 3a3 to the area 3a4 according to the copy command 30c and transmits the generated copy instruction CI3 to the interface 2c. The interface 2c copies the initial values stored in the areas 3a1 to 3a3 to the area 3a4 according to the copy instruction CI3. When the completion of the copying of the initial values from the areas 3a1 to 3a3 to the area 3a4 using the interface 2c is recognized, the controller main unit 2a transmits a completion notification CN4 thereof to the interface 2b. The interface 2b transmits the completion notification CN4 to the initialization apparatus 100 through the communication line 10.

The interface 120 of the initialization apparatus 100 receives the completion notification CN4 from the storage apparatus 1 through the communication line 10. The interface 120 transmits the completion notification CN4 to the controller 110. When the completion notification CN4 is received from the initialization apparatus 100, the controller 110 recognizes that the initialization process of the initialization target area 3a has been completed based on the received completion notification CN4.

Next, contents of the control process of the initialization apparatus 100 will be described with reference to FIG. 4. FIG. 4 is a flowchart that illustrates the initialization process.

The initialization apparatus 100 determines an initialization target area 3a of the memory 3 of the storage apparatus 1 (S1). The initialization apparatus 100 determines an area 3a1, in which the initial value is written first, of the initialization target area 3a, generates a write command for writing the initial value into the storage area 3a1, and transmits the generated write command 20a to the storage apparatus 1. When the write command 20a is received from the initialization apparatus 100, the storage apparatus 1 writes the initial value into the storage area 3a1 according to the received write command 20a (S2) and returns the completion notification thereof to the initialization apparatus 100. The initialization apparatus 100 determines areas of a copy source and a copy destination for the initialization target area 3a and generates a copy command based on a result of the determination. For example, the initialization apparatus 100 determines the areas of the copy source and the copy destination as areas 3a1 and 3a2, generates a copy command 30a for copying the initial value stored in the area 3a1 to the area 3a2, and transmits the generated copy command 30a to the storage apparatus 1. When the copy command 30a is received from the initialization apparatus 100, the storage apparatus 1 copies initialized data, in other words, the initial value that has already been in the area to an area having a size of (K−1) times the size of the area according to the received copy command 30a (S3). For example, the storage apparatus 1 copies the initial value stored in the area 3a1 to an area 3a2 having a size of (K−1) times the size of the area 3a1. The storage apparatus 1 returns the completion notification thereof to the initialization apparatus 100.

Then, the initialization apparatus 100 determines whether or not there remains an uninitialized area in the initialization target area 3a (S4). For example, in a case where completion notifications received after S3 are completion notifications CN1 to CN3, the initialization apparatus 100 determines that there remains an uninitialized area (True at S4), and the process is returned to S3. For example, in a case where a completion notification received after S3 is a completion notification CN4, the initialization apparatus 100 determines that there remains no uninitialized area (False at S4), and the process ends.

In addition, the value of K described above may be changed during in the process of repeating S3 and S4.

As described above, in the first embodiment, the initialization apparatus 100 performs control of the storage apparatus 1 to write an initial value in the area 3a1 of the initialization target area 3a and copy the initial value that is already stored in the area to the other areas 3a2 to 3a4. Accordingly, in transmitting a command from the initialization apparatus 100 to the storage apparatus 1 for the initialization process, a second command and subsequent commands may be set as copy commands not including data to be written. As a result, a time until the completion of reception of a command using the interface 2b after the start of transmission of the command using the interface 120 can be shortened. In addition, a time required for the data transmission from the interface 2b to the controller main unit 2a inside the storage apparatus 1 and a time required for the data transmission from the controller main unit 2a to the interface 2c can be shortened. Accordingly, the initialization process executed by the initialization apparatus 100 can be performed at a high speed.

In addition, in the first embodiment, for example, the copy command 30a copies all the initial values stored in the area 3a1 to the area 3a2. In other words, the copy command 30a performs copying so as to increase the size of the area in which the initial value is stored by two times. Accordingly, the initialization process can be performed by efficiently copying the initial value.

It should be noted that, as a modified example of the first embodiment, when an end portion of the data initialization area is initialized, in a case where the size of the area in which the initial value is stored being increased by K times (for example, two times) is too large, the copying process may be performed utilizing the size of the remaining portion.

Figure 5:
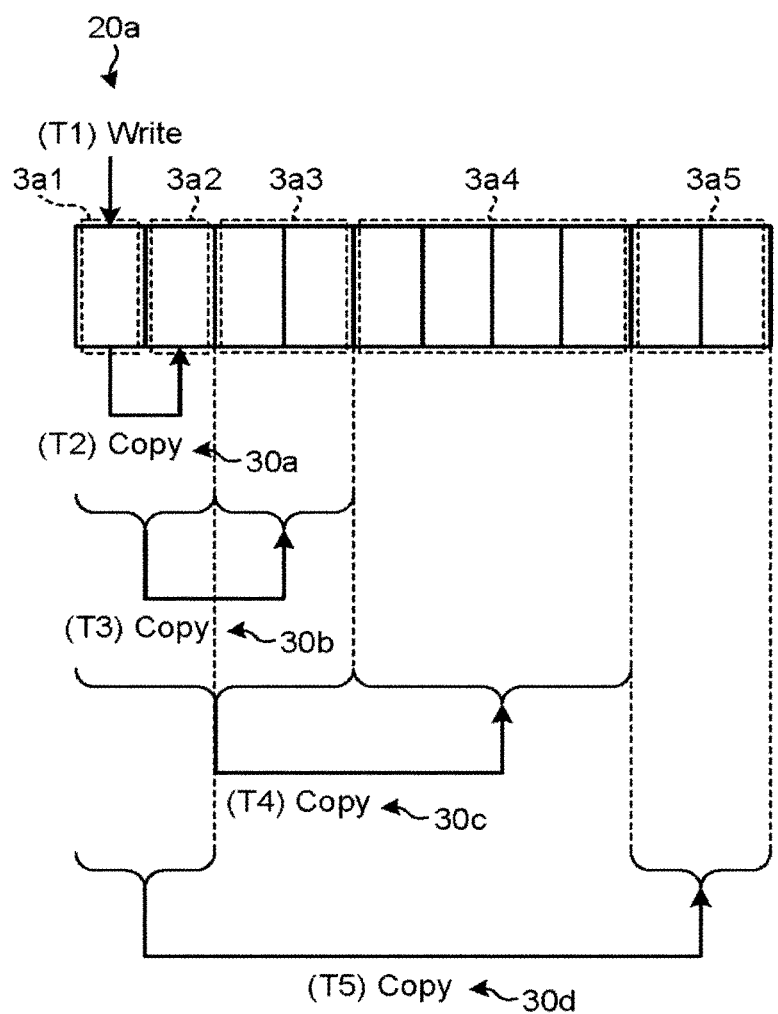
FIG. 5 is a diagram that illustrates an initialization process of a modified example of the first embodiment.

For example, as illustrated in FIG. 5, in a period T5 after periods T1 to T4 in which a control process similar to that of the first embodiment is performed, the initialization apparatus 100 specifies an uninitialized area of the initialization target area 3a as the area 3a5 according to a completion notification CN4. FIG. 5 is a diagram that illustrates the initialization process. The initialization apparatus 100 recognizes that the size of the area 3a5 is smaller than (K−1) times (for example, 1x) the total size of the areas 3a1 to 3a4 in which the initial values are already been stored and generates a copy command 30d of which the copy size is the size of the area 3a5. The copy command 30d is a command for copying a part of the initial values of the areas 3a1 to 3a4, in which the initial values are already stored, to the area 3a5.

In FIG. 5, a case of K=2 (times) is illustrated, and the following Equation 5 is formed for the copy command 30d.

$$\text{(size of data to be copied)} = \text{(size of area } 3a5) < 1 \times \text{(total size of areas } 3a1 \text{ to } 3a4 \text{ in which initial values have already been stored)} \quad \text{Equation 5}$$

For example, the controller 110 transmits the generated copy command 30d to the interface 120. The interface 120 transmits the copy command 30d to the storage apparatus 1 through the communication line 10.

The interface 2b of the storage apparatus 1 receives the copy command 30d from the initialization apparatus 100 through the communication line 10. The interface 2b transmits the copy command 30d to the controller main unit 2a. The controller main unit 2a generates a copy instruction CI4 for copying the initial values stored in a part (for example, areas 3a1 and 3a2) of the areas 3a1 to 3a4 to the area 3a5 according to the copy command 30d and transmits the generated copy instruction CI4 to the interface 2c. The interface 2c copies the initial values stored in the part (for example, the areas 3a1 and 3a2) of the areas 3a1 to 3a4 to the area 3a5 according to the copy instruction CI4. When the completion of the copying of the initial values from the part (for example, the areas 3a1 and 3a2) of the areas 3a1 to 3a4 to the area 3a5 using the interface 2c is recognized, the controller main unit 2a transmits a completion notification CN5 thereof to the interface 2b. The interface 2b transmits the completion notification CN5 to the initialization apparatus 100 through the communication line 10.

The interface 120 of the initialization apparatus 100 receives the completion notification CN5 from the storage apparatus 1 through the communication line 10. The interface 120 transmits the completion notification CN5 to the controller 110. When the completion notification CN5 is received from the initialization apparatus 100, the controller 110 recognizes that the initialization process of the initialization target area 3a has been completed based on the received completion notification CN5.

Figure 6:
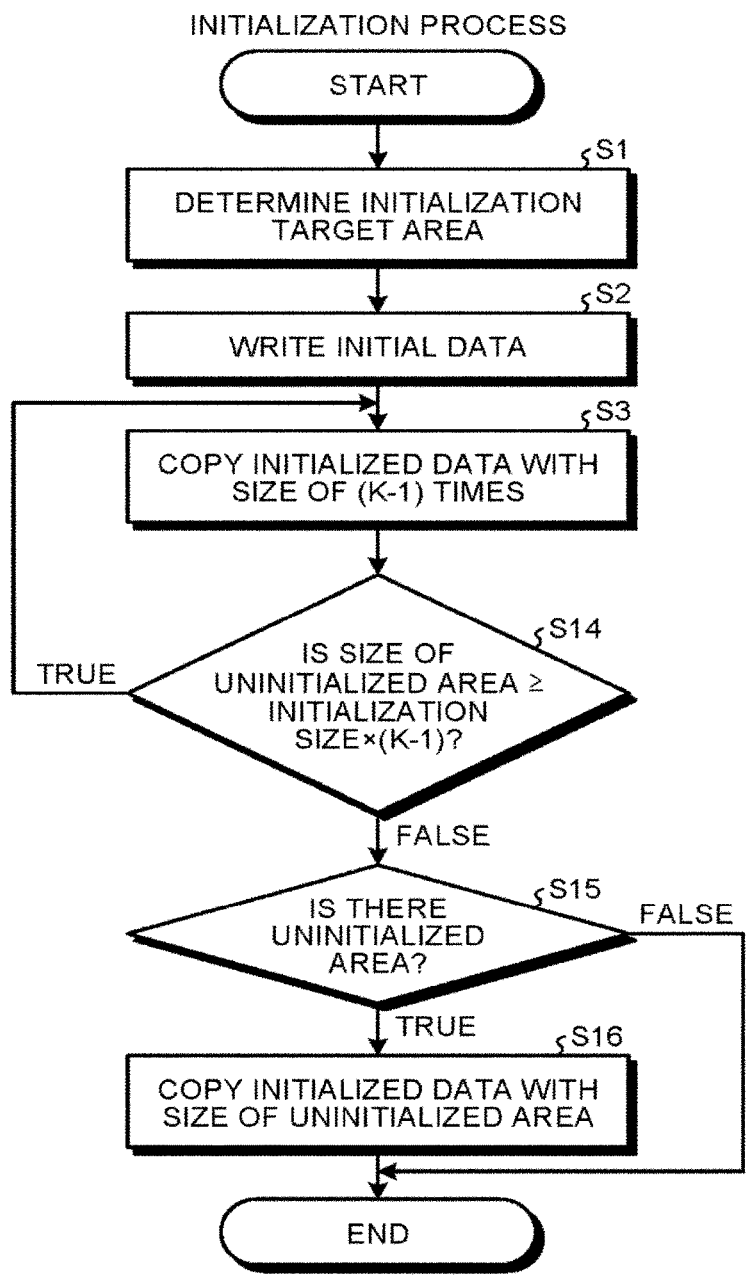
FIG. 6 is a flowchart that illustrates the initialization process of the modified example of the first embodiment.
Figure 7:
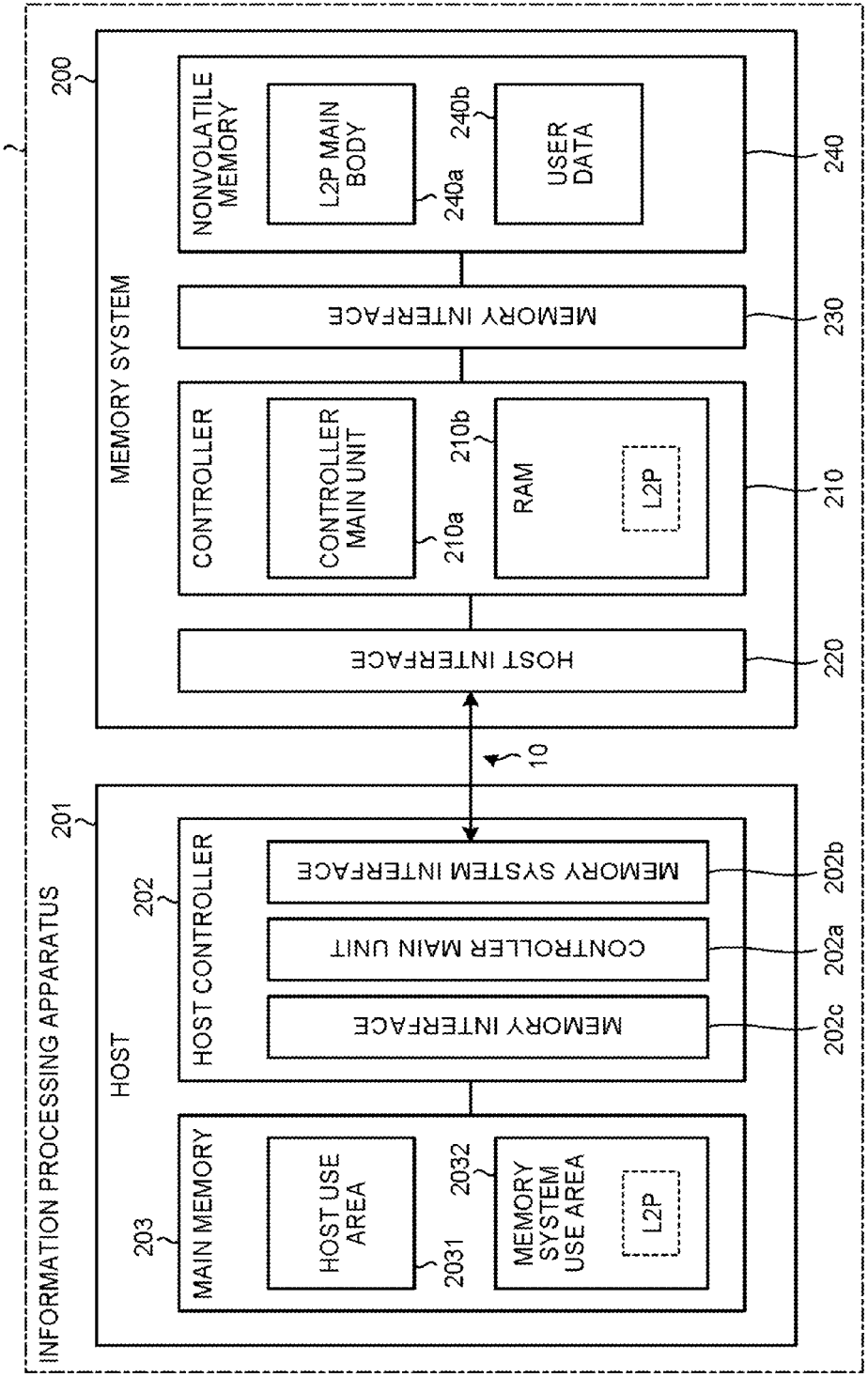
FIG. 7 is a diagram that illustrates the configuration of a memory system according to a second embodiment.

In addition, in this modified example, contents of the control process of the initialization apparatus 100, as illustrated in FIG. 6, are different from those of the first embodiment in the following points. FIG. 6 is a flowchart that illustrates the initialization process.

When the copying of the initial values (S3) is completed, the initialization apparatus 100 determines whether or not the size of the uninitialized area of the initialization target area 3a is (K−1) times the size of the initialized area or more (S14). In a case where the size of the uninitialized area is (K−1) times the size of the initialized area or more (True at S14), the initialization apparatus 100 determines that the copying process for increasing the size of the area in which the initial values are stored by K times (for example, two times) can be performed, and the process is returned to S3. In a case where the size of the uninitialized area is less than (K−1) times the size of the initialized area (False at S14), the initialization apparatus 100 determines that the copying process for increasing the size of the area in which the initial values are stored by K times (for example, two times) cannot be performed, and the process proceeds to S15. Even in a case where the size of the uninitialized area is less than (K−1) times the size of the initialized area, when no uninitialized area remains (False at S15), the initialization apparatus 100 determines that the initialization process is completed and ends the process. When there remains an uninitialized area (True at S15), the initialization apparatus 100 copies initialized data, in other words, initial values corresponding to the size of the uninitialized area among the initial values that are already stored in the area to the uninitialized area (S16. Accordingly, in the copying process for increasing the size of the area, in which the initial values are stored, by K times (for example, two times), even in a case where a large uninitialized area is generated, the initialization process can be completed.

Second Embodiment

In a second embodiment, as a specific example of the initialization apparatus 100 and the storage apparatus 1 according to the first embodiment, a memory system 200 and a host 201 are illustrated. Hereinafter, parts different from those of the first embodiment will be focused in the description.

The memory system 200 is included in an information processing apparatus 205. The information processing apparatus 205 includes: the memory system 200; a communication line 10; and a host 201. In the information processing apparatus 205, the memory system 200 is connected to the host 201 through the communication line 10.

The memory system 200, for example, is a flash memory of a built-in type, a solid state drive (SSD), or the like. The host 201, for example, may be an information processing apparatus such as a personal computer, a mobile phone, or an imaging apparatus, may be a mobile terminal such as a tablet computer or a smartphone, a gaming device, or an in-vehicle terminal such as a car navigation system. As the communication specification of the communication line 10, for example, mobile industry processor interface (MIPI) M-PHY is employed.

The memory system 200 includes: a controller 210; a host interface 220; a memory interface 230, and a nonvolatile memory 240.

The nonvolatile memory 240, for example, is a NAND flash memory. However, the nonvolatile memory 240 is not limited to the NAND flash memory but, for example, may be a flash memory having a three-dimensional structure, a resistance random access memory (ReRAM), a ferroelectric random access memory (FeRAM), or the like. The NAND flash memory is configured by one or more memory chips each including a memory cell array. The memory cell array is configured by arranging a plurality of memory cells in a matrix pattern. Each memory cell array is configured by arranging a plurality of blocks that are units for data erasing. In addition, each block is configured by a plurality of pages. Each page is a unit for data writing and data reading.

The nonvolatile memory 240 stores an L2P table 240a and user data 240b transmitted from the host 201. The user data 240b, for example, includes an operating system program (OS) that provides the execution environment of the host 201, a user program that is executed on the OS by the host 201, data that is input/output by the OS or the user program, and the like.

The L2P table 240a is one of management information that is necessary for the memory system 200 to serve as an external storage apparatus for the host 201 and is address translation information associating a logical block address (LBA), which is used when the host 201 accesses the memory system 200, with a physical address (block address+page address+storage position within page) within the nonvolatile memory 240. In an L2P cache area 300 to be described later, a part of this L2P table 240a is cached. In order to be discriminated from a content cached in the L2P cache area 300, hereinafter, the L2P table 240a stored in the nonvolatile memory 240 will be referred to as an L2P main body 240a.

The controller 210 includes a controller main unit 210a and a RAM 210b. The RAM 210b is used as a buffer for storing data to be written into the nonvolatile memory 240 or data read from the nonvolatile memory 240. In addition, the RAM 210b is used as a command queue that queues commands relating to a write request, a read request, and the like that are input from the host 201. For example, the RAM 210b may be configured by a small-scale SRAM, a DRAM, or the like. In addition, the function of the RAM 210b may be implemented using a register or the like.

It should be noted that, although an example where the RAM 210b is arranged inside the controller 210 is described in this embodiment, a configuration may be employed in which the RAM 210b is arranged independently from the controller 210.

The controller main unit 210a controls data transmission between the host 201 and the RAM 210b through the host interface 220 and controls data transmission between the RAM 210b and the nonvolatile memory 240 through the memory interface 230. In addition, the controller main unit 210a, for example, is configured by a microcomputer unit that includes an arithmetic device and a storage apparatus. As the arithmetic device executes firmware stored in the storage apparatus in advance, the function of the controller main unit 210a is realized. In addition, it may be configured such that the storage apparatus is omitted from the controller main unit 210a, and the firmware is stored in the nonvolatile memory 240. Furthermore, the controller main unit 210a may be configured by using an ASIC.

The host 201 includes a host controller 202 and a main memory 203. The host controller 202 includes: a controller main unit 202a, a memory system interface 202b; and a main memory interface 202c.

The main memory 203, for example, is configured by a DRAM. The main memory 203 includes: a host use area 2031; and a memory system use area 2032. The host use area 2031 is used as a program expansion area at the time of executing the OS or the user program using the host 201 and a work area at the time of executing the program expanded in the program expansion area. The memory system use area 2032 is used as a cache area for management information of the memory system 200 and reading/writing data. Here, as an example of the management information cached in the memory system 200, the L2P table 240a is used.

Figure 8:
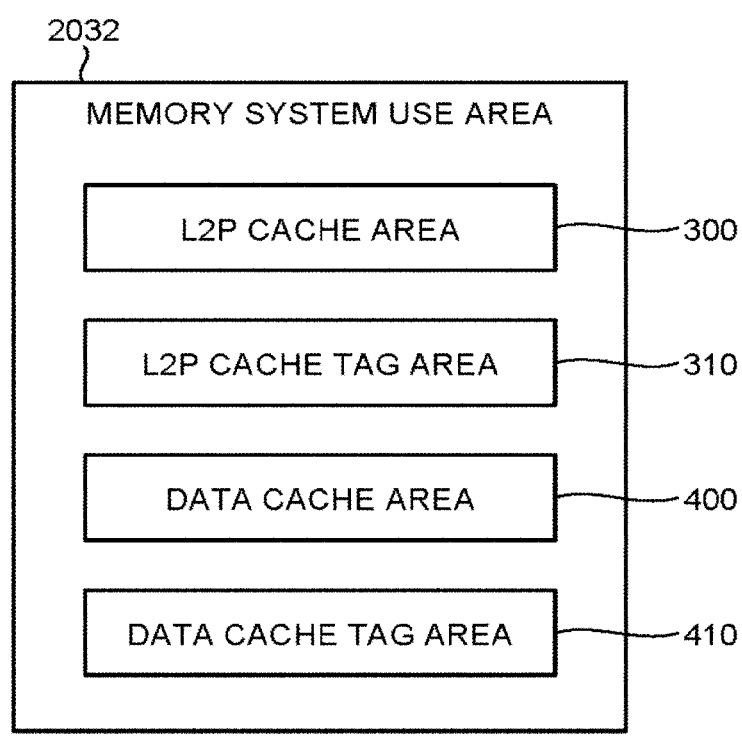
FIG. 8 is a diagram that illustrates the configuration of a memory system use area according to the second embodiment.

The memory system use area 2032, for example, has the configuration as illustrated in FIG. 8. FIG. 8 is a diagram that illustrates the configuration of the memory system use area 2032.

As illustrated in FIG. 8, the memory system use area 2032 includes: an L2P cache area 300 in which a part of the L2P main body 240a is cached; an L2P cache tag area (first tag area) 310 in which tag information used for a hit/miss determination of the L2P cache area 300 and management information (first management information) including a valid L2P (VL) bit are stored; a data cache area 400 that is a memory area having a cache structure in which read/write data is buffered; and a data cache tag area (second tag area) 410 in which tag information used for a hit/miss determination of the data cache area 400 and management information (second management information) including a valid buffer (VB) bit are stored. An area combining the L2P cache tag area (first tag area) 310 and the data cache tag area (second tag area) 410 may be considered as a management information area in which the management information of the memory system 200 is stored.

For example, the L2P cache tag area 310 has a memory structure as illustrated in FIG. 9, and an L2P cache area 300 has a memory structure as illustrated in FIG. 10. FIG. 9 is a diagram that illustrates the configuration of the L2P cache tag area 310. FIG. 10 is a diagram that illustrates the configuration of the L2P cache area 300.

Here, as an example, the LBA has a data length of 26 bits, and the L2P cache area 300 is referred to by using a value of low-order 22 bits of the LBA. Here, the value of high-order four bits of the LBA will be denoted as T, and the value of low-order 22 bits will be denoted as L in the description. In addition, the LBA is assumed to be assigned to each page (here, 4 Kbytes) that configures the nonvolatile memory 240.

In each cache line configuring the L2P cache area 300, as illustrated in FIG. 10, a physical address (Phys. Addr.) of one LBA is stored. The L2P cache area 300 is configured by 2 to the power of 22 cache lines. Each cache line has a capacity of four bytes that is the number of bytes of a size that is necessary and sufficient for storing a physical address of 26 bits. Accordingly, the L2P cache area 300 has a total size acquired by multiplying 2 raised to the power of 22 by four bytes, in other words, a total size of 16 Mbytes. In addition, the L2P cache area 300 is configured such that physical addresses corresponding to LBAs are stored in order of the value of L. In other words, each cache line configuring the L2P cache area 300 is read out by referring to an address acquired by adding the base address (L2P Base Addr.) of the L2P cache area 300 to 4*L.

In addition, as illustrated in FIG. 9, in the L2P cache tag area 310, for each cache line stored in the L2P cache area 300, values T as tag information are registered in order of the value of L. Each entry includes a field 311 in which the tag information is stored and a field 312 in which a valid L2P (VL) bit representing whether or not the cache line is a valid cache line is stored. Here, a valid cache line is a cache line for which data cached in a cache area within the cache line is valid data. On the other hand, an invalid cache line is a cache line for which data cached in a cache area within the cache line is invalid data. In other words, in the L2P cache tag area (management information area) 310, for each cache line, the management information (first management information) including the valid L2P (VL) bit representing whether or not a part (logical/physical translation information) of the L2P main body 240*a* is stored in the L2P cache area 300 is stored.

Here, the L2P cache tag area 310 is configured such that T registered in the L2P cache tag area 310 as the tag information coincides with the high-order bits T of an LBA corresponding to the physical address stored in the cache line (in other words, a cache line referred to by using L) corresponding to the L2P cache area 300. In other words, whether or not the physical address corresponding to a desired LBA is cached in the L2P cache area 300 is determined by referring to an address acquired by adding the base address (L2P Tag Base Addr.) of the L2P cache tag area 310 to the value of L configuring the desired LBA and based on whether or not tag information stored in the reference position coincides with the value of T configuring the desired LBA. In a case where both values coincide with each other, it is determined that the physical address corresponding to the desired LBA is cached. On the other hand, in a case where both values do not coincide with each other, it is determined that the physical address corresponding to the desired LBA is not cached. In addition, since T has a value of four bits, and a VL bit requires a capacity of one bit, each entry has a capacity of one byte. Accordingly, the L2P cache tag area 310 has a size acquired by multiplying 2 to the power of 22 by one byte, in other words, a size of 4 Mbytes.

It should be noted that the configurations of the data cache area 400 and the data cache tag area 410 are similar to those of the L2P cache area 300 and the L2P cache tag area 310. For example, in the data cache tag area 410, for cache lines stored in the data cache area 400, values T as the tag information are registered in order of the value of L. Each entry includes a field in which the tag information is stored and a field in which a valid buffer (VB) bit representing whether the cache line is a valid cache line is stored. In other words, in the data cache tag area (management information area) 410, for each cache line, management information (second management information) including a valid buffer (VB) bit representing whether or not read data or write data is stored in the data cache area 400 is stored.

For example, at timing immediately after the startup of the main memory 203, a part of the L2P main body 240*a* is not cached in the L2P cache area 300, and accordingly, the VL bit of each cache line needs to have an invalid value (for example, a bit value "0"). Even in such a case, in a case where the VL bit has a valid value (for example, a bit value "1"), the cache line is erroneously recognized as a valid cache line, and the L2P cache area 300 of the cache line is referred to. In order not to generate such an unnecessary process, it is preferable that an area (for example, an area enclosed by dotted lines in FIG. 9) having continuous addresses including the L2P cache tag area 310 is determined as an initialization target area and, similar to the first embodiment, is initialized.

Figure 11:
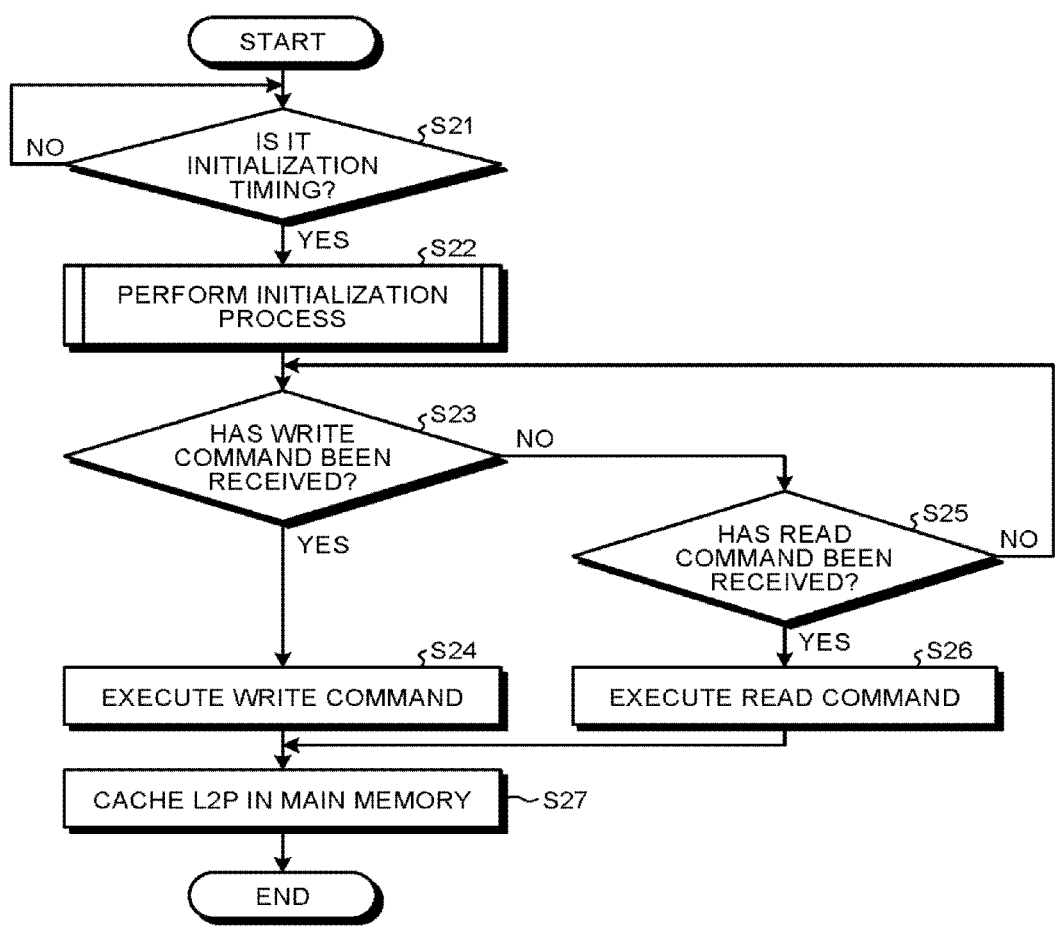
FIG. 11 is a flowchart that illustrates the operation of an information processing apparatus according to the second embodiment.

More specifically, the information processing apparatus 205 performs an operation as illustrated in FIG. 11. FIG. 11 is a flowchart that illustrates the operation of the information processing apparatus 205.

Figure 12:
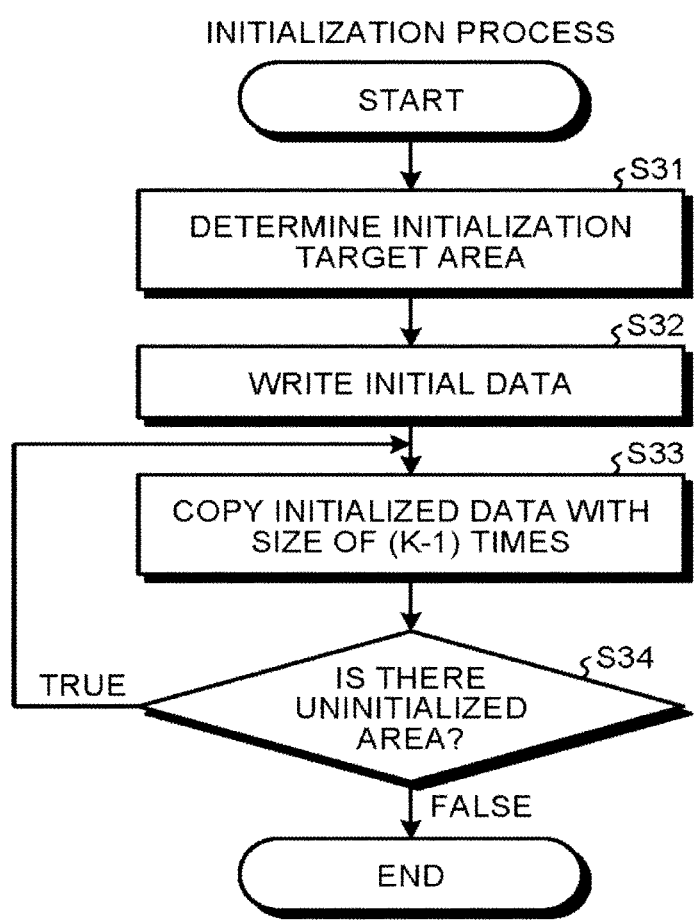
FIG. 12 is a flowchart that illustrates an initialization process according to the second embodiment.

The memory system 200 determines whether or not it is timing for executing the initialization process (S21). For example, the memory system 200, after starting up, stands by until a notification of the use permission for the memory system use area 2032 is received from the host 201 (No at S21). When the notification of the use permission of the memory system use area 2032 is received (Yes at S21), the memory system 200 determines that it is timing for executing the initialization process and executes the initialization process (S22). In the initialization process (S22), a process illustrated in FIG. 12 is executed. FIG. 12 is a flowchart that illustrates the initialization process.

For example, the memory system 200 determines an area, which includes the L2P cache tag area 310 and the data cache tag area 410, having continuous addresses as the initialization target area 203*a* (see FIGS. 9 and 10) of the main memory 203 of the host 201 (S31). In FIGS. 9 and 10, the initialization target area 203*a* is represented as being surrounded by broken lines. The memory system 200 determines an area 203*a*1, into which the initial value is to be written first, of the initialization target area 203*a*, generates a write command 20*a* for writing the initial value into the storage area 203*a*1, and transmits the generated write command 20*a* to the host 201. When the write command 20*a* is received from the memory system 200, the host 201 writes the initial value into the storage area 203*a*1 in response to the received write command 20*a* (S32) and returns a completion notification thereof to the memory system 200. The memory system 200 determines areas of the copy source and the copy destination for the initialization target area 203*a* and generates a copy command according to a result of the determination. For example, the memory system 200 determines areas 203*a*1 and 203*a*2 as the areas of the copy source and the copy destination, generates a copy command 30*a* for copying the initial value stored in the area 203*a*1 to the area 203*a*2, and transmits the generated copy command 30*a* to the host 201. When the copy command 30*a* is received from the memory system 200, the host 201 copies the initialized data, in other words, the initial value that has already been stored in the area to an area having a size of (K−1) times the size of the area in response to the received copy command 30*a* (S33). For example, the host 201 copies the initial value stored in the area 203*a*1 to the area 203*a*2 having a size of (K−1) times the size of the area 203*a*1. The host 201 returns a completion notification thereof to the memory system 200.

Then, the memory system 200 determines whether or not there remains an uninitialized area in the initialization target area 203*a* (S34). For example, in a case where the completion notification received after S33 is one of the completion notification CN1 to CN3, the memory system 200 determines that there remains an uninitialized area (True at S34) and returns the process to S33. On the other hand, for example, in a case where the completion notification received after S33 is the completion notification CN4, the memory system 200 determines that no uninitialized area remains (False at S34) and ends the process.

Referring back to FIG. 11, when the initialization process (S22) is completed, the memory system 200 stands by until a write command is received (No at S23) or a read command is received (No at S25).

When a write command is received (Yes at S23), the memory system 200 executes the write command (S24). At this time, the memory system 200 determines whether or not a part of the L2P main body 240a corresponding to an LBA included in the write command is present on the RAM 210b. In a case where a part of the L2P main body 240a is not present on the RAM 210b, the memory system 200 determines whether or not the LBA included in the write command hits the L2P cache tag area 310. In the case of no hitting, the memory system 200 determines whether or not the LBA included in the write command hits the L2P main body 240a on the nonvolatile memory 240. In the case of hitting, the memory system 200 caches the part of the L2P main body 240a including the LBA included in the write command in the RAM 210b. In addition, the memory system 200 caches the part of the L2P main body 240a including the LBA included in the write command in the L2P cache area 300 (S27 and updates the L2P cache tag area 310. For example, the memory system 200 rewrites a VL bit of the same cache line of the L2P cache tag area 310 as the cache line in which the part of the L2P main body 240a is loaded inside the L2P cache tag area 300 from an invalid value (for example, a bit value "0") to a valid value (for example, a bit value "1").

Meanwhile, when a read command is received (Yes (S25), the memory system 200 executes the read command (S26). At this time, the memory system 200 determines whether or not a part of the L2P main body 240a corresponding to an LBA included in the read command is present on the RAM 210b. In a case where a part of the L2P main body 240a is not present on the RAM 210b, the memory system 200 determines whether or not the LBA included in the read command hits the L2P cache tag area 310. In the case of no hitting, the memory system 200 determines whether or not the LBA included in the read command hits the L2P main body 240a on the nonvolatile memory 240. In the case of hitting, the memory system 200 caches the part of the L2P main body 240a including the LBA included in the read command in the RAM 210b. In addition, the memory system 200 caches the part of the L2P main body 240a including the LBA included in the read command in the L2P cache area 300 (S27) and updates the L2P cache tag area 310. For example, the memory system 200 rewrites a VL bit of the same cache line of the L2P cache tag area 310 as the cache line in which the part of the L2P main body 240a is loaded inside the L2P cache area 310 from an invalid value (for example, a bit value "0") to a valid value (for example, a bit value "1").

As described above, in the second embodiment, the memory system 200 performs control of the host 201 to write an initial value in the area 203a1 of the initialization target area 203a and copy the initial value that is already stored in the area to the other areas 203a2 to 203a4. Accordingly, in transmitting a command from the memory system 200 to the host 201 for the initialization process, a second command and subsequent commands may be set as copy commands not including data to be written. As a result, a time until the completion of reception of a command using the memory system interface 202b after the start of transmission of the command using the host interface 220 can be shortened. In addition, a time required for the data transmission from the memory system interface 202b to the controller main unit 202a inside the host 201 and a time required for the data transmission from the controller main unit 202a to the main memory interface 202c can be shortened. Accordingly, the initialization process executed by the memory system 200 can be performed at a high speed.

In addition, in the second embodiment, for example, the copy command 30a copies all the initial values stored in the area 203a1 to the area 203a2. In other words, the copy command 30a performs copying so as to increase the size of the area in which the initial value is stored by two times. Accordingly, the initialization process can be performed by efficiently copying the initial value (see FIG. 3).

It should be noted that, as a modified example of the second embodiment, when an end portion of the data initialization area is initialized, in a case where the size of the area in which the initial value is stored being increased by K times (for example, two times) is too large, the copying process may be performed utilizing the size of the remaining portion (see FIG. 5).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, the host including a host controller and a host memory, the host memory including a first memory area and a second memory area, the second memory area being used as a cache by the memory system, the second memory area including a third memory area and a fourth memory area, the memory system comprising:
 a nonvolatile memory; and
 a controller configured to:
  control the non-volatile memory,
  decide an initialization target area in the second memory area,
  send the host a write command, the write command being a command to write an initialization value to a 1st area, the 1st area being included in the initialization target area,
  determine whether a data size of an uninitialized area is less than (K−1) times a data size of an initialized area in the initialization target area, K being a number that is pre-determined to be more than one or to be less than two or equal to two,
  when the data size of the uninitialized area is not less than (K−1) times the data size of the initialized area in the initialization target area, send the host a first copy command, the first copy command being a command to copy the initialization value stored in the initialized area to a 2nd area, the 2nd area being included in the uninitialized area, a data size of the 2nd area being equal to (K−1) times of the data size of the initialized area,
when the data size of the uninitialized area is more than zero and is less than (K−1) times the data size of the initialized area in the initialization target area, send the host a second copy command, the second copy command being a command to copy the initialization value stored in the initialized area to a 3rd area, the 3rd area being included in the uninitialized area, a data size of the 3rd area being less than (K−1) times the data size of the initialized area and being equal to the data size of the uninitialized area,
when the data size of the uninitialized area is equal to zero in the initialization target area, complete the initialization of the initialization target area.

2. The memory system according to claim 1, wherein the controller is further configured to pre-determine K=2 when increasing the data size of the initialized area in the initialization target area by two times with using the first copy command.

3. The memory system according to claim 1, wherein the initialization value is a bit pattern of all "0"s.

4. The memory system according to claim 1, wherein the initialization value is a bit pattern of all "1"s.

5. The memory system according to claim 1, wherein the initialization value is a bit pattern in which "0"s and "1"s are mixed.

6. The memory system according to claim 1, wherein the controller decides the initialization target area in the second memory area, when receiving use permission of the second memory area.

7. The memory system according to claim 1, wherein the controller determines whether the data size of the uninitialized area is less than (K−1) times the data size of the initialized area in the initialization target area, when receiving a response of sent command from the host.

8. The memory system according to claim 1, wherein the controller is further configured to cause, after the initialization of the initialization target area is completed, at least part of management information for the memory system and data stored in the nonvolatile memory to be stored in the third memory area, and causes data for management of information stored in the third memory area to be stored in the fourth memory area.

9. The memory system according to claim 8, wherein the management information includes an address translation information that associates a logical address with a physical address in the nonvolatile memory.

10. The memory system according to claim 1, wherein the nonvolatile memory is a NAND-type flash memory.

11. An information processing apparatus comprising:
a host; and
a memory system connectable to the host,
wherein the host includes a host controller and a host memory, the host memory including a first memory area and a second memory area, the second memory area being used as a cache by the memory system, the second memory area including a third memory area and a fourth memory area,
and wherein the memory system includes:
a nonvolatile memory; and
a controller configured to:
control the non-volatile memory,
decide an initialization target area in the second memory area,
send the host a write command, the write command being a command to write an initialization value to a 1st area, the 1st area being included in the initialization target area,
determine whether a data size of an uninitialized area is less than (K−1) times a data size of an initialized area in the initialization target area, K being a number that is pre-determined to be more than one or to be less than two or equal to two,
when the data size of the uninitialized area is not less than (K−1) times the data size of the initialized area in the initialization target area, send the host a first copy command, the first copy command being a command to copy the initialization value stored in the initialized area to a 2nd area, the 2nd area being included in the uninitialized area, a data size of the 2nd area being equal to (K−1) times of the data size of the initialized area,
when the data size of the uninitialized area is more than zero and is less than (K−1) times the data size of the initialized area in the initialization target area, send the host a second copy command, the second copy command being a command to copy the initialization value stored in the initialized area to a 3rd area, the 3rd area being included in the uninitialized area, a data size of the 3rd area being less than (K−1) times the data size of the initialized area and being equal to the data size of the uninitialized area,
when the data size of the uninitialized area is equal to zero in the initialization target area, complete the initialization of the initialization target area.

12. The information processing apparatus according to claim 11, wherein
the controller is further configured to pre-determine K=2 when increasing the data size of the initialized area in the initialization target area by two times with using the first copy command.

13. The information processing apparatus according to claim 11, wherein
the initialization value is a bit pattern of all "0"s.

14. The information processing apparatus according to claim 11, wherein
the initialization value is a bit pattern of all "1"s.

15. The information processing apparatus according to claim 11, wherein
the initialization value is a bit pattern in which "0"s and "1"s are mixed.

16. The information processing apparatus according to claim 11, wherein
the controller decides the initialization target area in the second memory area, when receiving use permission of the second memory area.

17. The information processing apparatus according to claim 11, wherein
the controller determines whether the data size of the uninitialized area is less than (K−1) times the data size of the initialized area in the initialization target area, when receiving a response of sent command from the host.

18. The information processing apparatus according to claim 11,
wherein the controller is further configured to cause, after the initialization of the initialization target area is completed, at least part of management information for the memory system and data stored in the nonvolatile memory to be stored in the third memory area, and causes data for management of information stored in the third memory area to be stored in the fourth memory area.

19. The information processing apparatus according to claim 18,
wherein the management information includes an address translation information that associates a logical address with a physical address in the nonvolatile memory.

20. The information processing apparatus according to claim 11,
wherein the nonvolatile memory is a NAND-type flash memory.

* * * * *